United States Patent
Clancy et al.

(10) Patent No.: US 8,484,203 B1
(45) Date of Patent: Jul. 9, 2013

(54) CROSS MEDIA TYPE RECOMMENDATIONS FOR MEDIA ITEMS BASED ON IDENTIFIED ENTITIES

(75) Inventors: Daniel J. Clancy, Los Altos, CA (US); Cristos J. Goodrow, Mountain View, CA (US); Yu He, Sunnyvale, CA (US); Kun Zhang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/343,172

(22) Filed: Jan. 4, 2012

(51) Int. Cl.
*G06F 17/30* (2006.01)

(52) U.S. Cl.
USPC ............................. 707/723; 705/26.7

(58) Field of Classification Search
USPC ............................. 707/723; 705/26.7
See application file for complete search history.

(56) References Cited

U.S. PATENT DOCUMENTS

| | | | |
|---|---|---|---|
| 6,266,649 B1 * | 7/2001 | Linden et al. | 705/7.29 |
| 7,908,183 B2 * | 3/2011 | Jacobi et al. | 705/26.7 |
| 7,921,042 B2 * | 4/2011 | Jacobi et al. | 705/26.7 |
| 7,970,664 B2 * | 6/2011 | Linden et al. | 705/26.7 |
| 7,974,872 B2 * | 7/2011 | Katayama et al. | 705/7.29 |
| 7,979,426 B2 * | 7/2011 | Jeong et al. | 707/723 |
| 8,019,777 B2 * | 9/2011 | Hauser | 707/769 |
| 8,024,222 B2 * | 9/2011 | Jacobi et al. | 705/14.53 |
| 8,050,960 B2 * | 11/2011 | Slaney et al. | 705/7.29 |
| 8,200,602 B2 * | 6/2012 | Farrelly | 706/46 |
| 2010/0287033 A1 * | 11/2010 | Mathur | 705/10 |
| 2011/0270703 A1 * | 11/2011 | Engle | 705/26.7 |

* cited by examiner

*Primary Examiner* — Kim Nguyen
(74) *Attorney, Agent, or Firm* — Fenwick & West LLP

(57) ABSTRACT

Recommendations for a media item associated with a primary entity are based on co-interaction information gathered from other media content items of several different media types that are also associated with the primary entity. Co-interaction information can include, for example, co-click data for websites, co-watch data for videos, or co-purchase data for purchases. The co-interaction data is processed to determine a co-interaction score between primary media items and secondary media items. From the co-interaction scores, secondary entities associated with the secondary media items are determined. A relatedness score is determined for these secondary entities based on the aggregation of the co-interaction scores of the secondary media items they are associated with. The relatedness score indicates a determination of how related one entity is to another. The secondary entities are ranked according to relatedness score in order to determine secondary entities most relevant to the primary entity.

19 Claims, 4 Drawing Sheets

CROSS MEDIA TYPE RECOMMENDATIONS FOR MEDIA ITEMS BASED ON IDENTIFIED ENTITIES

BACKGROUND OF THE INVENTION

1. Field of the Invention

The present application is related to providing recommendations of media items of various media types for a media item of a different type.

2. Description of the Background Art

Many websites also provide access to different types media content items (or "media items", or "items"), such as music, movies, e-books, news articles, user generated content, and so forth. In many case, recommendations are made to other items that are believed to be related (or relevant) to whatever item is currently presented to a user. Many different techniques may be used to determine what related items to display. One technique includes a simple listing of the most popular items available to the website. Another technique includes tagging each item with a descriptive tag that summarizes the content of the item, wherein two items are determined to be related if they have the same tag.

A more robust technique for determining other related items is to measure co-interactions between different media content items of the same type. For example, in order to determine what news articles posted on a website are relevant to each other, user interactions with the website may be monitored to track the website links users visit on a computer (e.g., by clicking with a mouse). The determination includes tracking what news article viewers view before or after viewing a given news article. This technique may be referred to co-click (or co-read or co-view) analysis, as it analyzes what other news articles a viewer clicks on to read in proximity to having clicked on the given news article. Here the co-click analysis is limited to media items of the same type (news articles).

The assumption underlying co-click analysis is that if a viewer clicks through to read some articles but not others, the articles the viewer chose to read are more likely to be related to each other than the articles not read. Aggregated over many viewers, co-click analysis provides a human-usage based view of relatedness between news articles. Co-click analysis may be performed for other content, and be referred to by different names. For example, for web hosted videos this analysis may be referred to as co-watch analysis, and for purchases of goods via internet this analysis may be referred to as co-purchase analysis. Again, each of these analyses requires that the media items are of the same type (e.g., video, purchased goods).

For new media content items that are being posted to the web site for the first time, no co-click statistics regarding the behavior of viewers are available as no user interactions have been recorded yet for the new item. As a consequence, conventional co-click analysis cannot be used to determine what other items are related to the new items. Thus some sites simply do not recommend related items until a sufficient number of user interactions have been obtained for the new item. However, the sooner such a determination is made (i.e., the lower the number of required interactions), the less accurate the determination is likely to be, so these sites typically must wait some period of time in order to accumulate a sufficiently large number of interactions. Not being able to provide recommendations of items related to new items during this period represents a potential loss of business for the website operator. For websites that host time-sensitive media content items, new items are often most viewed when they initially appears on the website. For these types of websites, conventional co-click analysis is unable to provide recommendations for related items when they are needed most.

SUMMARY OF THE INVENTION

A system and methodology provide for cross media type recommendations for media items based on entities associated with the media items. Entities are text descriptors for nouns, for example actual things, ideas, or concepts that have meaning. Recommendations for a media content item associated with an entity are based on co-interaction information gathered from other media content items of several different media types that are also associated with that same entity. For example, if a website is to provide recommendations regarding other videos that are related to a video a viewer is currently watching, the recommendations are be based co-interaction analyses performed on other types of media items, such as news articles, blog posts, online purchases, social media content, books, search queries, as well as other videos that are associated with a common entity with the video in question. Determining which media content items to recommend includes performing a co-interaction analysis between the media content items that share the entity with the requested media content item and other media content items associated with other entities.

In one embodiment, a requested media item to be presented to a user is received. A list of primary entities associated with the media item is obtained. For each primary entity in the list, a ranked list of secondary entities is determined that are related to the primary entities. From the list of ranked secondary entities, secondary media items associated with the ranked secondary entities are selected. The selected secondary media items are provided as being related to the requested media item.

To determine the ranked list of secondary entities, a co-interaction analysis is performed for each primary entity. A list of primary media items of various media types is determined that share the primary entity with the requested media item. For each of the primary media items, co-interaction data is gathered to determine what secondary media items users interacted with in proximity to interacting with the primary media items. Co-interaction data can include, for example, co-click data for websites, co-watch data for videos, or co-purchase data for purchases. The co-interaction data is processed to determine a co-interaction score between primary media items and secondary media items.

From the co-interaction scores, secondary entities associated with the secondary media items are determined. A relatedness score is determined for these secondary entities based on an aggregation of the co-interaction scores of the secondary media items they are associated with. The relatedness score indicates a determination of how related one entity is to another entity based on the co-interaction scores between the media items associated with each entity. The secondary entities are ranked according to relatedness score in order to determine the secondary entities most relevant to the primary entity.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
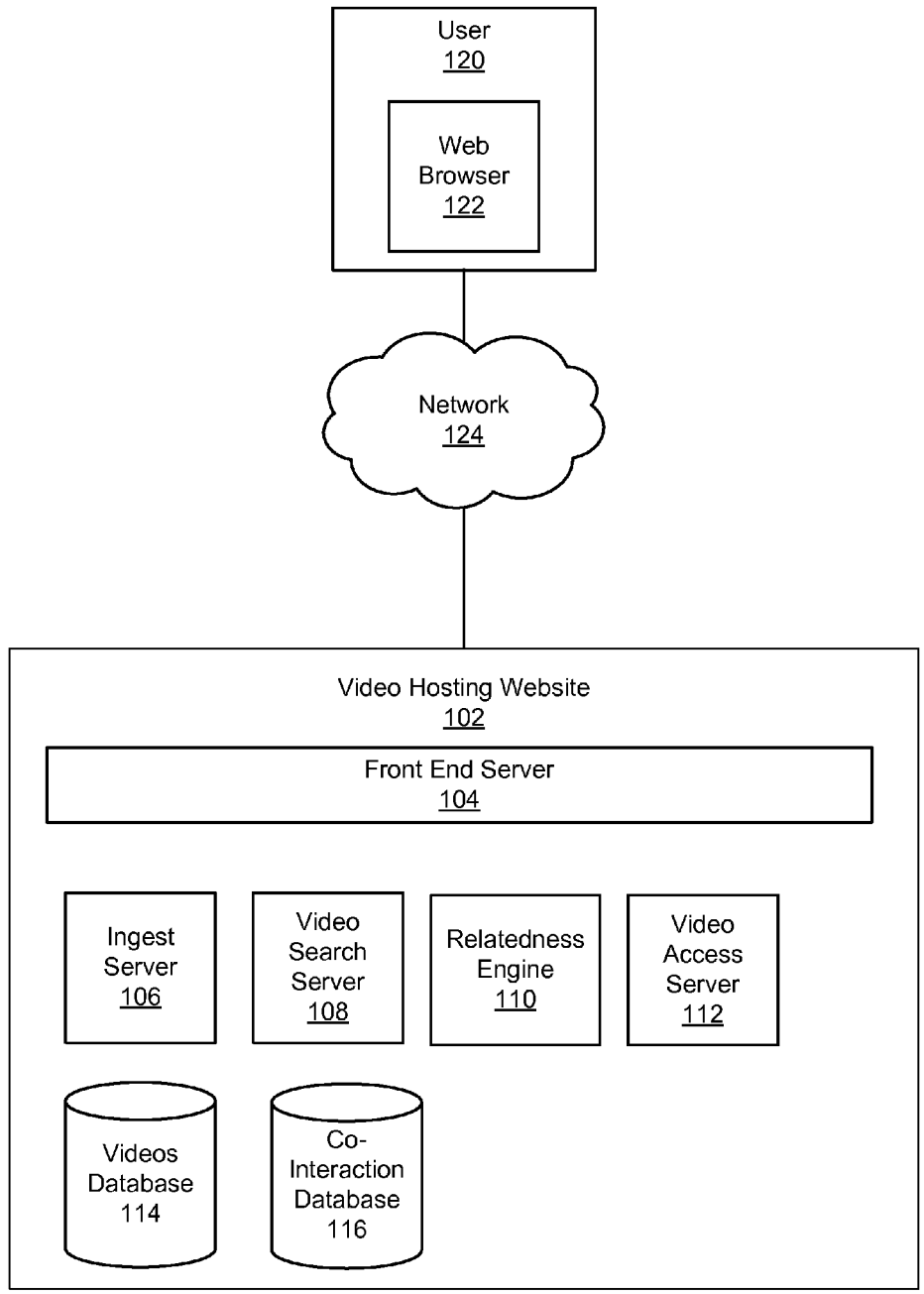
FIG. 1 is a high-level block diagram of a system providing cross media type recommendations for media items based on identified entities according to one embodiment.

FIG. 1 is a high-level block diagram of a system providing cross media type recommendations for media items based on identified entities according to one embodiment. FIG. 1 illustrates a video hosting website 102 and a user connected by a network 124. The user represents an entity that can access videos contained within the video hosting website 102. A user can access a video from the video hosting website 102 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting website 102 is adapted to receive videos for storage in order to enable the sharing of the videos with other users.

In one embodiment, the user uses a computer system to communicate with the video hosting website 102 over the network 124. In one embodiment, the computer system is a personal computer executing a web browser 122 such as MICROSOFT INTERNET EXPLORER or MOZILLA FIREFOX that allows the user to view web pages and videos provided by the video hosting website 102. In one embodiment, the web browser 122 includes a video player (e.g., Flash™ from Adobe Systems, Inc.). The user may utilize a network-capable device other than a computer system, such as a personal digital assistant (PDA), a cellular telephone, a pager, a television "set-top box" etc. Although FIG. 1 illustrates only a single user, it should be understood that many (e.g., millions) users can communicate with the website at any time. The single user 120 is illustrated in order to simplify and clarify the present description.

The network 124 represents the communication pathways between the user and the video hosting website 102. In one embodiment, the network 124 is the Internet, but may also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting website 102 represents any system that allows users to access video content via searching and/or browsing interfaces. The sources of videos can be from user uploads of videos, searches or crawls of other websites or databases of videos, or the like, or any combination thereof. For example, in one embodiment a video hosting site 102 can be configured to allow for user uploads of content; in another embodiment a video hosting website 102 can be configured to only obtain videos from other sources by crawling such sources or searching such sources in real time.

A suitable video hosting website 102 for implementation of the system is the YOUTUBE™ website; other video hosting websites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting website 102 comprises a front end server 104, an ingest server 106, a video search server 108, a relatedness engine 110, a video access server 112, a videos database 114, an entity database 116, and a co-interaction database 118. Many conventional features, such as firewalls, load balancers, application servers, failover servers, site management tools and so forth are not shown so as not to obscure the features of the system.

The front end server 104 handles all communication with the user via the network 124. The front end server receives requests from users and communicates with the other servers of the website 102 in order to process the requests. The front end server 104 is further configured to monitor user interactions with the video hosting website 102. For example, if a user clicks on a web page, views a video, makes a purchase, opens a document, fills a web-based form, the front end server 104 monitors these interactions. Additionally, interactions between different items presented by the video hosting website 102 are monitored by the front end server 104 and are recorded in the co-interaction database 116.

Any content received via the network 124 from a user for posting to the website 102 is passed on to the ingest server 106 for processing. The processing of the video file includes assigning an identification number to the newly received video file. Other steps of processing the video file may include formatting (e.g., transcoding), compressing, metadata tagging, content analysis, and/or other data processing methods. The user transmits a form along with the video file transmitted to the website 102. The user may include in the form information that describes the video (e.g., title, description, and tag information). The form information may also include an indication of the media type, which for uploaded videos would always be the "video" type. The ingest server 106 stores the processed video file in a video database 114 and stores the information included in the form as metadata of the video file. The video database 114 is the storage system where the video files transmitted to the website 102 are stored.

The video search server 108 processes any search query received by the front end server 104 from a user. The search query transmitted by the user to the front end server 104 includes search criteria, such as keywords that may identify videos the user is interested in viewing. The video search server 108 uses the search criteria to query the metadata of all video files stored in the videos database 114. The search results from the query are transmitted to the front end server 104, so that the search results can be presented to the user.

The video access server 112 receives from the front end server requests from users that wish to view (or play back) a specific video. From the user perspective, a user may execute a request by browsing the different categories of the website 102 or by clicking on a link to a video from a search results webpage. The request transmitted by the user can include the identification number of the video the user wishes to view (this can be included automatically once the user clicks on the link for the video). The video access server 112 uses the identification number to search and locate where the video is stored in the videos database 114. The video access server 112 provides the video requested to the front end server 104.

The relatedness engine 110 determines other videos that are related to the requested video. For example, if the identification number for a requested video has been received by the front end server 104 from a user 120, the identification number may be used by the relatedness engine 110 to find other videos related to the requested video. Once the related videos have been determined the relatedness engine 100 provides the related videos to the front end server 104 so that they may be viewed by the user. The related videos may be accompanied by icons or thumbnail views of each of the related videos, along with associated metadata, such as title, author, tags and rating. It should be appreciated that the data processing operations of the relatedness engine 110, as described herein, inherently require a programmed computer system for their practical implementation.

The front end server 104 is further configured to transmit and present the requested video and related video links to the user on a webpage. The requested video is streamed by the front end server 104 to the user. One or more related video links appear on the webpage where the requested video is playing, such that the related video link can be selected by a user 120 in order to view the related videos.

To simplify and clarify the present description, the content received and shared by the video hosting website 102 will be referred to as videos, video files, or video items, but it should be understood that the website 102 can receive and share content of any media type. This content may be referred to as media content items, media items, or items. Thus, the operations of the relatedness engine 110 described herein for identifying related items can be applied to any type of media content item, not only videos; other suitable type of content items include audio files (e.g. music, podcasts, audio books, and the like), documents, multimedia presentations, digital purchases of goods and services, and so forth. Each item's metadata includes an indication of the type of media for that item, for example, video, audio, document, purchase, or presentation.

Determining Related Videos

Figure 3:
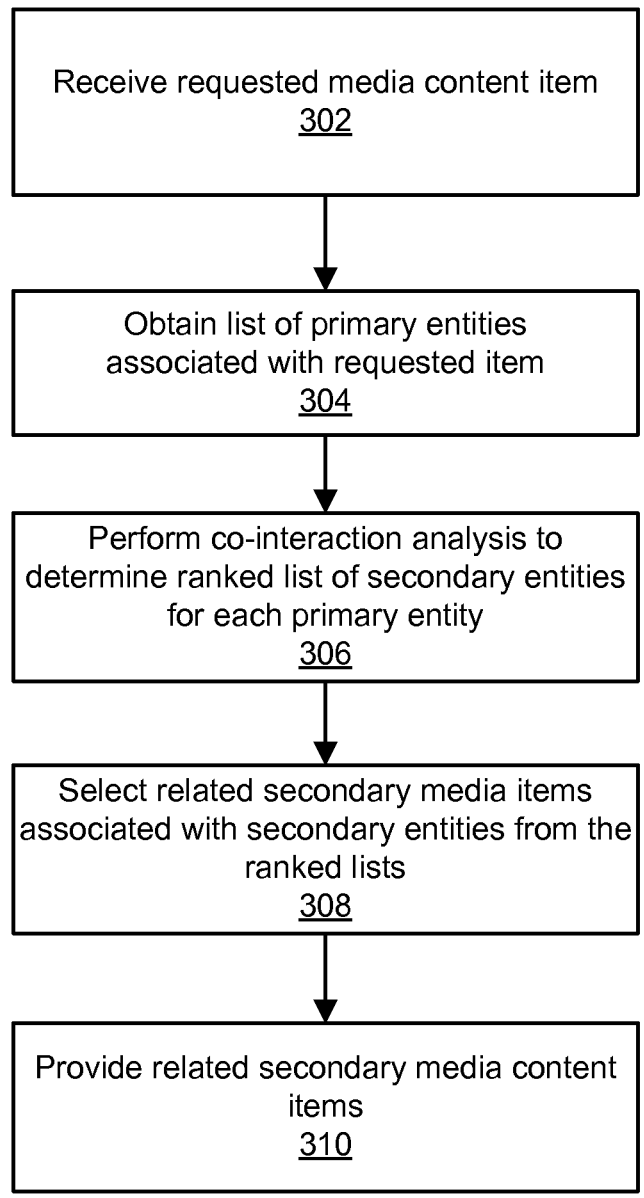
FIG. 3 is a flowchart illustrating a process for providing cross media type recommendations for media items based on identified entities, according to one embodiment.

FIG. 3 is a flowchart illustrating a process for providing cross media type recommendations for media items based on identified entities, according to one embodiment. The relatedness engine 110 is configured to generate a list of media items related to a requested media content item to provide to a user 120 as recommendations. The relatedness engine 110 receives 302 either a requested item or an identification number for a requested item, depending upon the implementation. In the case of receiving the identification number, the relatedness engine 110 obtains the metadata relating to the requested item from the database 114.

To determine other related media content items related to a requested media content item, the relatedness engine 110 obtains 304 a list of entities associated with the requested item from the metadata stored in the database 114. This list of entities may be referred to as a list of primary entities.

Entities are text descriptors for nouns, for example actual things, ideas, or concepts that have meaning For example, "Barack Obama", "fencing", "philosophy", and "scary" are all examples of entities. In the context of the hosting website 102, entities identify characteristics of media content items. Entities are stored with media content items as metadata, for example in the database 114. Each item may have one or more entities associated with it. For example, if a video clip depicted an Australian cattle dog catching a frisbee in Golden Gate Park, the entities stored as meta data may include "dog", "frisbee", "San Francisco", "Australian cattle dog", "jump", "play", and "Golden Gate Park" among others. Multiple media content items may share one or more entities with other items in the database 114. Two media content items share an entity if both items have the entity listed as part of their associated metadata stored in the database 114. A list of primary entities may be obtained from external sources such as Freebase™ and Wikipedia™. In a typical embodiment, the primary entity list contains anywhere between 1 and 100 primary entities, however the primary entity list may contain any number of primary entities.

Entities may be assigned to media content items when they are ingested by the ingest server 106. Entities may be derived from tags or other descriptive information provided by a user. For videos, entities may be derived from textual descriptions and metadata accompanying the videos, as well as closed captioning text present in the video, or by converting audio to text and then extracting entities from the text. For textual documents (e.g., web pages, emails, etc.), entities may be determined using term frequency analysis, semantic analysis, natural language processing, or other methods. An index is maintained in the database 114 that associates each entity the set of content items to which it is assigned. The set of content items to which a given entity is assigned are said to 'share' the entity. In addition, for each content item, there is maintained a list of the entities assigned to the content item.

Figure 4:
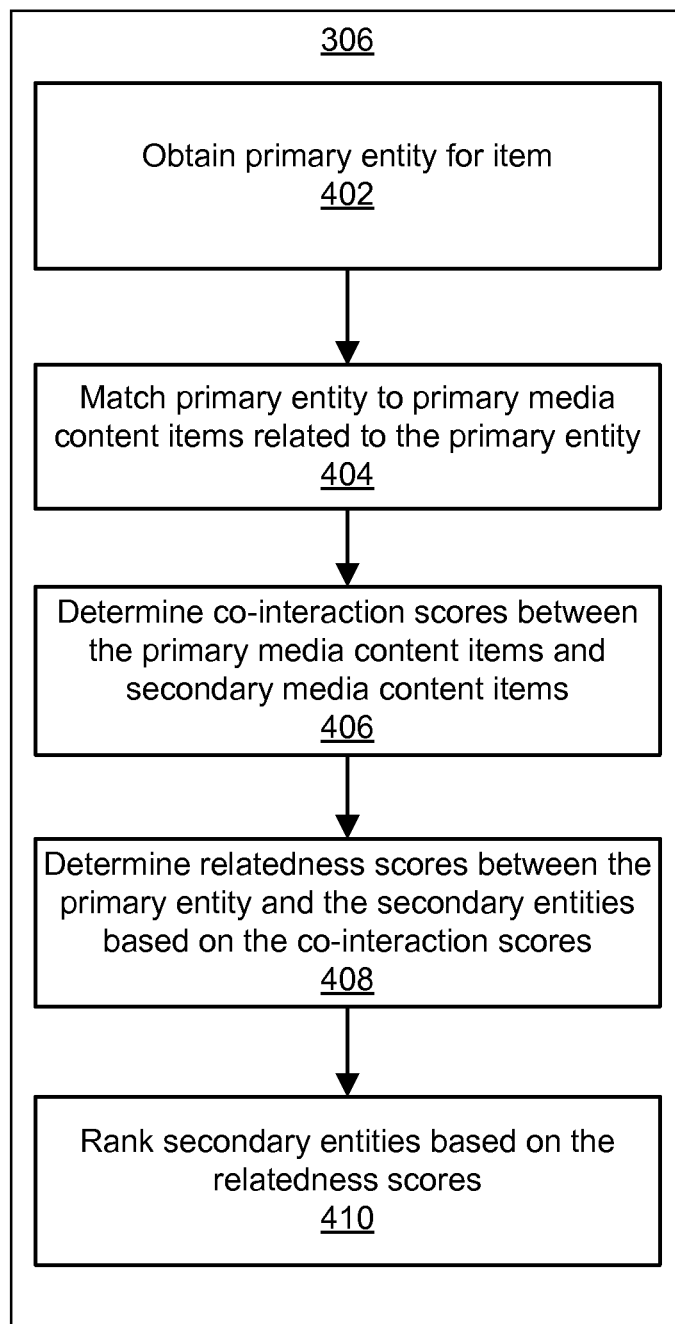
FIG. 4 is a flowchart illustrating a process for co-interaction analysis, according to one embodiment.

The relatedness engine 110 leverages co-interaction information previously obtained for media content items sharing primary entities with the requested item in order to determine related items. The processing of the co-interaction information to determine related items may be referred to as a co-interaction analysis 306. FIG. 4 is a flowchart illustrating a process for co-interaction analysis, according to one embodiment. FIG. 4 separately illustrates the individual steps of a co-interaction analysis 306.

The co-interaction analysis may be performed at when the user requests a media content item, or it may be processed asynchronously and stored, and then retrieved later. The advantage of performing the co-interaction analysis at runtime is that the results will contain the most up to date co-interaction information, and thus will provide the most accurate result for related items. The advantage of performing the co-interaction analysis asynchronously and storing the results is that the analysis can be offloaded to periods of lower demand for the video hosting website 102, thereby helping prevent the website 102 from overloading and increasing the utilization of resources during off-peak times.

In the co-interaction analysis, for each primary entity in the list of primary entities 402, the relatedness engine 110 searches the database 114 to find 404 other media content items that share the primary entity with the requested item. The other items which share a primary entity with the requested item may be referred to as primary media content items, primary media items, or primary items. The media types of the primary items may differ from the media type of the requested item. For example, the requested media item may have a media type of video, and the media types of the primary items may be one or more of video, audio, purchase, document, web page.

For each primary item a count of the number of co-interactions is determined 406 between the primary item and secondary media content items stored in the database 114. Secondary media content items are media content items that do not share an entity with the requested item. That is, the media items' respective lists of entities have no members in common.

As an example of primary and secondary items, a requested item may have a primary entity list of "sailing", "boat", "San Francisco", and "America's Cup". As above, a primary item shares one or more of the primary entities with the requested item. In this example, a primary item may have an entity list of "sailing" "trimaran", "capsizing", "boat", and "San Francisco". A secondary item does not share any does not share any of the primary entities with the requested item. In this example, a secondary item may have an entity list of "Larry Ellison", "Oracle", "Sun Microsystems", "Netezza", and "cloud computing".

Co-interactions may include, for example, co-clicks between media items, co-watch data, and co-purchase data. Co-interaction data is gathered through the monitoring of the use of the hosting website 102 by users 120, and is stored in the co-interaction database 116. The count of the number of co-interactions between each primary and secondary item may be referred to as a co-interaction score. Such a co-interaction score may be used to determine a ranking of the primary items, secondary items, primary entity, or secondary entity. For instance, the higher the co-interaction score, the higher the ranking of the respective primary or secondary item. As the media types of the primary items may vary from the media type of the requested item, similarly the co-interactions that contribute to co-interaction scores may be with secondary items that have media types different from the requested item.

A co-interaction is logged in the co-interaction database 116 each time a user 120 transitions between one item and another item. For example, if the user is viewing a first document on a first webpage, and then clicks or types a link to a second document on a second webpage, a co-interaction is stored indicating the first and second documents. In one embodiment, co-interactions are stored by incrementing a numeric value in a matrix, where the rows and columns of the matrix contain all documents in the database 114. The count of the number of co-interactions between two items may be zero or higher.

The relatedness engine 110 can be configured to impose constraints on what constitutes a co-interaction. In one embodiment, a co-interaction only includes a direct transition from a first item to a second item. In this context, direct implies that the user was interacting with a first item, for example viewing the first item on a first web page, and then responsive to user input on the first web page, the user was thereafter then interacting with the second item, for example viewing the second item on a second web page, without viewing any other content item in between the first and second content items.

In another embodiment, co-interactions include indirect transitions between the first and second item. For example, a user may interact with a first item, subsequently interact with one or more intermediate items, and then subsequently interact with the second item. In this case, the intermediate interactions do not prevent the later interaction with the second item from contributing to the co-interaction score between the first and second items.

Co-interactions may be weighted to take into account the indirectness (or degree of separation) between the interaction with the first item and the interaction with the secondary item. For example, if a direct co-interaction between a first and second item contributes a value of 1 to the co-interaction score, an indirect co-interaction may be weighted between 0 and 1 depending upon the degree of separation. For example, if there was a single intermediate interaction, the co-interaction may be weighted 0.8 to the co-occurrence score; if there were two intermediate interactions may be weighted 0.6, and so forth. The weightings can decay linearly (as in this example) or non-linearly. The contribution to co-interaction score for indirect interactions may also be based on time between interactions, rather than degree of separation, with the weighting decreasing proportionally with the increase in time between the interactions.

In one embodiment, co-interactions are stored separately for each type of media content items. For example, co-interactions between documents may gathered and stored separately from co-interactions between video files, purchases, audio files, web sites, or other types of media. In this embodiment, the primary items and secondary items may have media types that differ from the media type of the requested item. However, in this embodiment, the only co-interactions that contribute co-interaction scores will be interactions between primary and secondary items having the same media type, regardless of whether their media type is the same or different from the media type of the requested item.

In another embodiment, co-interaction are stored across media types. For example, the co-interaction database 116 may contain a matrix with entries for interactions between every item of media of every available media type in the database 114. Also in this embodiment, the primary items and secondary items may have media types that differ from the media type of the requested item. However, in this embodiment, co-interactions that contribute co-interaction scores will be interactions between primary items of any media type, and secondary items of any media type, regardless of whether their media types are the same as each other, and again regardless of whether their media types are the same or different from the requested item.

For example, it may contain an entry between a first document and a first video, where the entry contains the number of times a viewed the first document, and then sometime near in time watched the first video, or vice versa. Because co-interaction matrices tend to be very sparsely populated, data reduction methods can be applied to reduce the required storage space, and thus represent the matrix more compactly.

The relatedness engine 110 uses the co-interaction scores between primary and secondary items to determine 408 a list of secondary entities that are related to each primary entity. Secondary entities may be any entity other than a primary entity. For each secondary item which has a nonzero co-interaction score, the relatedness engine 110 determines a list of secondary entities, where the secondary entities are entities that are listed in the metadata of the secondary items, but that are not already one of the primary entities. The relatedness engine 110 determines a relatedness score 408 for each secondary entities. The relatedness score for a secondary entity is determined by aggregating the co-interaction scores of all secondary items that list the secondary entity in their metadata.

The relatedness engine 110 ranks 410 the secondary entities according to their relatedness scores. In other embodiments, such a relatedness score may also be used to determine a ranking of the primary items, secondary items, or the primary entity. The relatedness engine 110 uses the ranked list of secondary entities to identify secondary items 308 that are related to the requested item. In one embodiment, one or more of the highest ranked secondary entities from each primary entity are selected, and the relatedness engine 110 interacts with the search server 108 to search for related media content items that list the selected secondary entities in their metadata. In one embodiment, the search for related media content items is restricted to items of the same media type as the requested item. One or more of the media items returned from the search are then provided 310 to the front end server 104 as related media content items.

Figures 2A, 2B:
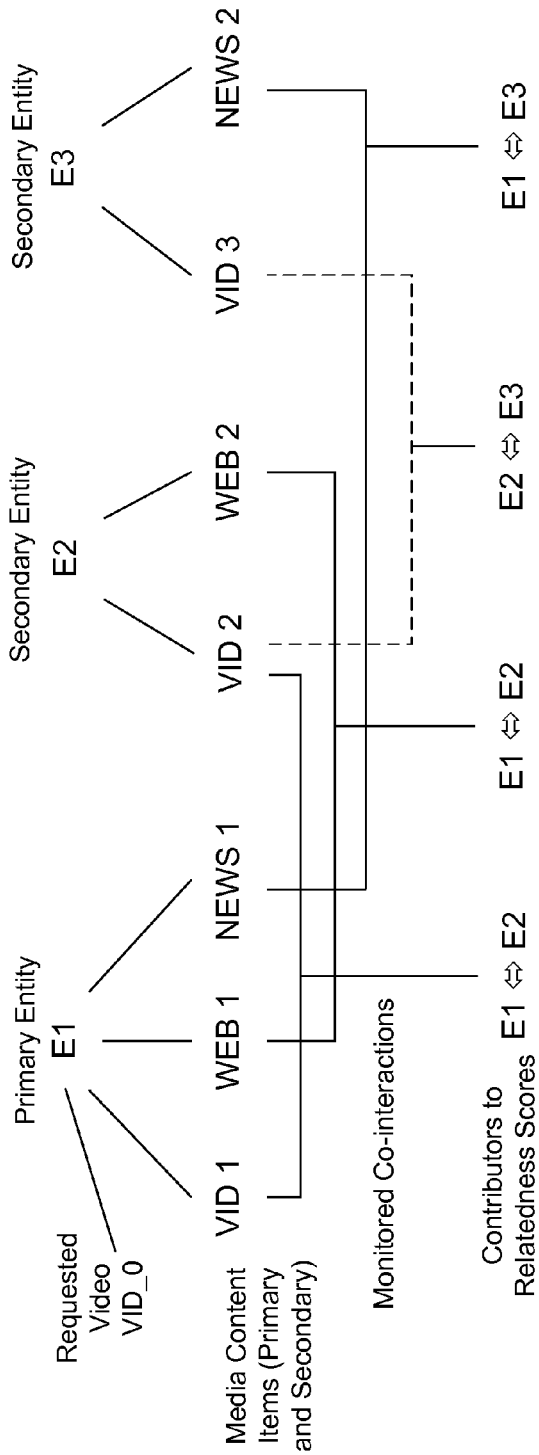
FIG. 2A is a diagram illustrating co-interaction analysis between a plurality of entities and their associated media content items according to one embodiment.
FIG. 2B is a table illustrating a determination of co-interaction scores according to one embodiment.

FIG. 2A is a diagram illustrating co-interaction analysis between a plurality of entities and their associated media content items according to one embodiment. In the example of FIG. 2A, a requested video VID 0 has metadata including primary entity E1. A number of primary items also list primary entity E1 in their metadata, including video VID 1, web page WEB 1, and news article NEWS 1.

The relatedness engine 110 determines co-interaction scores between the primary items VID 1, WEB 1, and NEWS 1 and secondary items VID 2, WEB 2, VID 3, and NEWS 2. In the example of FIG. 2A, the lines linking the primary and secondary items are visual depictions of direct and indirect co-interactions by user 120 that were monitored by the hosting website 102 and stored in the co-interaction database 116. In this example, direct co-interactions, illustrated by solid lines, were recorded between VID 1 and VID 2, WEB 1 and WEB 2, NEWS 1 and NEWS 2. Additionally, an indirect co-interaction, illustrated by a dashed line, was recorded between VID 2 and VID 3. In this example, the direct co-interactions contribute 1 to the co-interaction score, and the indirect co-interaction contributes 0.5 to the co-interaction score. Though for simplicity only one co-interaction between each item is visually depicted, it is expected that there will be many more co-interactions in most cases (e.g., millions).

The relatedness engine 110 determines secondary entities for the secondary items. In this example, items VID 2 and WEB 2 are associated with secondary entity E2, and VID 3 and NEWS 2 are associated with secondary entity E3, respectively, according to their metadata. The relatedness engine 110 determines relatedness scores for each of the secondary entities. For E2, two direct co-interactions, between VID 1 and VID 2, and between WEB 1 and WEB 2, contribute to a relatedness score of 2. For E3, two co-interactions, a direct co-interaction between NEWS 1 and NEWS 2, and an indirect co-interaction between VID 2 and VID 3 (through the direct co-interaction between VID 1 and VID 2), contribute to a relatedness score of 1.5.

FIG. 2B is a table illustrating a determination of co-interaction scores according to one embodiment. The table illustrates a ranking of secondary entities based on their relatedness scores. In relation to primary entity E1, secondary entity E2 has a higher relatedness score of 2, than secondary entity E3 with a relatedness score of 1.5. As a consequence, E2 ranks more highly than E3 with respect to primary entity E1.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for generating recommendations for media items related to a primary entity comprising:
    storing a plurality of entities including a primary entity and a plurality of secondary entities, wherein the entities are text descriptors for describing media items;
    storing a plurality of different media types, wherein for different media types, there are a plurality of media items having the media type;
    matching the primary entity to a plurality of primary media items, each of the primary media items having one of the media types, and so that there are a plurality of the different media types among the primary media items;
    determining a plurality of co-interaction scores between the primary media items and a plurality of secondary media items, wherein at least one of the co-interaction scores is between media items having a first media type,
    wherein at least one of the co-interaction scores is between media items having a second media type, and
    wherein the first media type is different from the second media type;
    matching the secondary media items to the secondary entities, each secondary media item associated with at least one secondary entity;
    determining a plurality of relatedness scores between the primary entity and each of the secondary entities, the relatedness scores based on the co-interaction scores; and
    ranking the secondary entities according to their respective relatedness scores.

2. The method of claim 1 comprising:
    receiving a request for media items related to a requested media item; and
    determining the primary entity related to the requested media item.

3. The method of claim 2 comprising:
    selecting an entity from the ranked list of secondary entities;
    selecting a media item associated the selected entity, the selected media item having the same media type as the requested media item; and
    providing the selected media item as a recommendation.

4. The method of claim 1 wherein media types for media items comprise at least one of: video, audio, documents, books, web pages, consumer goods purchases, and social media content.

5. The method of claim 1 wherein each media item comprises a item description tag and each entity comprises a entity description tag, and wherein matching the primary entity to the primary media items comprises matching the entity description tag to the item description tag.

6. The method of claim 1 wherein the co-interaction scores are determined based on monitoring a plurality user interactions with one or more of the primary media items and one or more of the secondary media items.

7. The method of claim 6 wherein a co-interaction score between a primary media item and a secondary media item is proportional to a number of monitored user interactions with both the primary media item and the secondary media item.

8. The method of claim 7 wherein the monitored user interactions comprise a direct user interaction and an indirect user interaction.

9. The method of claim 8 wherein the direct user interaction between the primary media item and the secondary media item contributes more to the co-interaction score than the indirect user interaction between the primary media item and the secondary media item.

10. The method of claim 1 wherein determining the relatedness score between the primary entity and a secondary entity comprises aggregating the co-interaction scores for all secondary media items associated with the secondary entity.

11. The system method of claim 1 wherein determining the relatedness score between the primary entity and a secondary entity the relatedness engine is further configured to comprises aggregating the co-interaction scores for the secondary media items associated with the secondary entity.

12. A system for determining media items related to a primary entity comprising:
    a database configured to store:
        a plurality of entities including a primary entity and a plurality of secondary entities, wherein the entities are text descriptors for describing media items,
        a plurality of different media types, wherein for different media types, there are a plurality of media items having the media type,
        associations between a plurality of primary media items and the primary entity, each of the primary media items having one of the media types, and so that there are plurality of the different media types among the primary media items, and
        associations between a plurality of secondary media items and a plurality of secondary entities, each secondary media item associated with at least one secondary entity;
    a computer comprising a processor for executing a relatedness engine;
    a non-transitory computer-readable storage medium storing the relatedness engine, the relatedness engine configured to:
    determine a plurality of co-interaction scores between the primary media items and the secondary media items,
    wherein at least one of the co-interaction scores is between media items having a first media type,
    wherein at least one of the co-interaction scores is between media items having a second media type, and
    wherein the first media type is different from the second media type;
    determine a plurality of relatedness scores between the primary entity and each of the secondary entities, the relatedness scores based on the co-interaction scores; and
    rank the secondary entities according to their respective relatedness scores.

13. The system of claim 12 wherein the video hosting website is configured to receive a request for media items related to a requested media item, and the relatedness engine is configured to determine the primary entity related to the requested media item.

14. The system of claim 13 wherein the relatedness engine is further configured to select an entity from the ranked list of secondary entities;
    select a media item associated the selected entity, the selected media item having the same media type as the requested media item; and
    provide the selected media item to a front end server as a recommendation.

15. The system of claim 12 wherein media types for media items comprise at least one of: video, audio, documents, books, web pages, consumer goods purchases, and social media content.

16. The system of claim 12 wherein the co-interaction scores are determined based on a plurality user interactions with one or more of the primary media items and one or more of the secondary media items, the user interactions previously monitored by a front end server.

17. The system of claim 16 wherein a co-interaction score between a primary media item and a secondary media item is proportional to a number of monitored user interactions with both the primary media item and the secondary media item.

18. The system of claim 17 wherein the monitored user interactions comprise a direct user interaction and an indirect user interaction.

19. The system of claim 18 wherein the direct user interaction between the primary media item and the secondary media item contributes more to the co-interaction score than the indirect user interaction between the primary media item and the secondary media item.

* * * * *